United States Patent
Baumer et al.

(10) Patent No.: US 12,536,774 B1
(45) Date of Patent: Jan. 27, 2026

(54) ENHANCED OBJECT DETECTION WITH RETRIEVAL AUGMENTED GENERATION AND LANGUAGE MODEL PROMPTING SYSTEM

(71) Applicant: Intuit Inc., Mountain View, CA (US)

(72) Inventors: Hadas Baumer, Tel Aviv (IL); Gad Markovits, Tel Mond (IL); Shon Mendelson, Tel Aviv (IL); Shirli Di-Castro Shashua, Kfar Saba (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/255,782

(22) Filed: Jun. 30, 2025

(51) Int. Cl.
 *G06V 10/70* (2022.01)
 *G06Q 30/0201* (2023.01)
 (Continued)

(52) U.S. Cl.
 CPC ....... *G06V 10/768* (2022.01); *G06Q 30/0201* (2013.01); *G06V 10/40* (2022.01); *G06V 10/761* (2022.01); *G06V 10/764* (2022.01); *G06V 10/82* (2022.01); *G06V 20/70* (2022.01); *G06V 10/774* (2022.01)

(58) Field of Classification Search
 CPC .... G06V 10/768; G06V 10/40; G06V 10/761; G06V 10/764; G06V 10/82; G06V 20/70; G06V 10/774; G06Q 30/0201
 See application file for complete search history.

(56) References Cited

U.S. PATENT DOCUMENTS

| | | | | |
|---|---|---|---|---|
| 2018/0150444 | A1* | 5/2018 | Kasina | G06F 40/186 |
| 2022/0292685 | A1* | 9/2022 | Heisler | G06T 7/11 |
| 2024/0406166 | A1* | 12/2024 | Bell | G06N 3/045 |

FOREIGN PATENT DOCUMENTS

| | | | | |
|---|---|---|---|---|
| KR | 102747558 B1 * | 1/2025 | | G16H 70/00 |
| WO | WO-2024258696 A1 * | 12/2024 | | G06V 10/82 |
| WO | WO-2025035924 A1 * | 2/2025 | | G06N 3/0464 |

OTHER PUBLICATIONS

Kim et al., "Retrieval-Augmented Open-Vocabulary Object Detection", Proceedings of the IEEE/CVF Conference on Computer Vision and Pattern Recognition (CVPR), 2024, pp. 17427-17436.
(Continued)

*Primary Examiner* — Samir A Ahmed
(74) *Attorney, Agent, or Firm* — Dinsmore & Shohl LLP

(57) ABSTRACT

Certain aspects of the disclosure provide a method for enhanced object detection. The method includes providing, to a machine learning (ML) model, a first prompt comprising a first image and a first instruction to output a first description; obtaining, from the ML model, the first description comprising an identification of an unidentified visual object; generating an embedding of the unidentified visual object; obtaining, from a retrieval augmented generation (RAG) database, an embedding associated with a known visual object and satisfying a similarity threshold; retrieving information associated with the known visual object; generating an enhanced context comprising the information associated with the known visual object; providing, to the ML model, a second prompt comprising the enhanced context and a second instruction to output a second description of the first image; and obtaining, from the ML model, the second description including an identification of a visual object associated with the unidentified visual object.

19 Claims, 10 Drawing Sheets

(51) Int. Cl.
  *G06V 10/40* (2022.01)
  *G06V 10/74* (2022.01)
  *G06V 10/764* (2022.01)
  *G06V 10/82* (2022.01)
  *G06V 20/70* (2022.01)
  *G06V 10/774* (2022.01)

(56) References Cited

OTHER PUBLICATIONS

Xue et al., "Enhanced Multimodal RAG-LLM for Accurate Visual Question Answering", Computer Vision and Pattern Recognition, 2024, arXiv:2412.20927v1.
Wu et al., "Self-correcting LLM-controlled Diffusion Models", Computer Vision and Pattern Recognition, 2024, URL: https://self-correcting-llm-diffusion.github.io (accessed Jun. 27, 2025).

* cited by examiner

ENHANCED OBJECT DETECTION WITH RETRIEVAL AUGMENTED GENERATION AND LANGUAGE MODEL PROMPTING SYSTEM

BACKGROUND

Field

Aspects of the present disclosure relate to detecting an object (e.g., a visual object) in a multi-modal content.

Description of Related Art

Generative artificial intelligence (GenAI) refers to machine learning models that are able to create new content based on patterns and information learned from training data in combination with a user prompt. The user prompt provides instruction to a model on what new content to generate and how to generate that new content. Notably, the model is able to generate new content based on both actual information (e.g., facts and knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens (e.g., units of text, such as words, parts of words, characters, etc.). At its core, an LM attempts to predict the probability of the next word in a sentence given the preceding words. The LM estimates these probabilities based on the patterns it learned during training. LMs are useful in natural language processing (NLP) and computational linguistics for performing a range of tasks involving human language.

Certain GenAI models are configured as multi-modal LMs, such as a multi-modal large language model (MLLM). An MLLM is a type of machine learning model that takes as input a multi-modal content (e.g., an audio such as voice or spoken-word commands or phrases, an image such as including a visual depiction of one or more objects, etc.) and generates an output based on the input. For example, an MLLM may receive an image as input and generate an output based on the image.

While LMs represent a transformative force in many industries by assimilating vast amounts of knowledge, these models are not without limitation. For example, while a powerful tool, a general-purpose LM may not be able to perform tasks related to generating specialized content that was not represented in the original training data or not enabled by its original configuration, resulting in an inaccurate or incorrect output in some cases.

SUMMARY

One aspect provides a method for generating an image description. The method includes providing, to a machine learning (ML) model, a first prompt comprising a first image and a first instruction to output a first description of the first image including a description of any unidentified visual object; obtaining, from the ML model, the first description, the first description comprising an identification of an unidentified visual object; generating an embedding of the unidentified visual object included in the first description; obtaining, from a retrieval augmented generation (RAG) database, an embedding associated with a known visual object and satisfying a similarity threshold with respect to the embedding of the unidentified visual object; retrieving information associated with the known visual object; generating an enhanced context comprising the information associated with the known visual object; providing, to the ML model, a second prompt comprising the enhanced context and a second instruction to output a second description of the first image; and obtaining, from the ML model, the second description including an identification of a visual object associated with the unidentified visual object from the first description.

Another aspect provides a method for wireless communications by an apparatus for generating an image description. The method includes generating a first description of a first image comprising an identification of an unidentified visual object; generating an embedding of the unidentified visual object included in the first description; obtaining, from a RAG database, an embedding associated with a known visual object and satisfying a similarity threshold with respect to the embedding of the unidentified visual object; retrieving information associated with the known visual object; generating an enhanced context comprising the information associated with the known visual object; and generating a second description of the first image, the second description including an identification of a visual object associated with the unidentified visual object from the first description.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
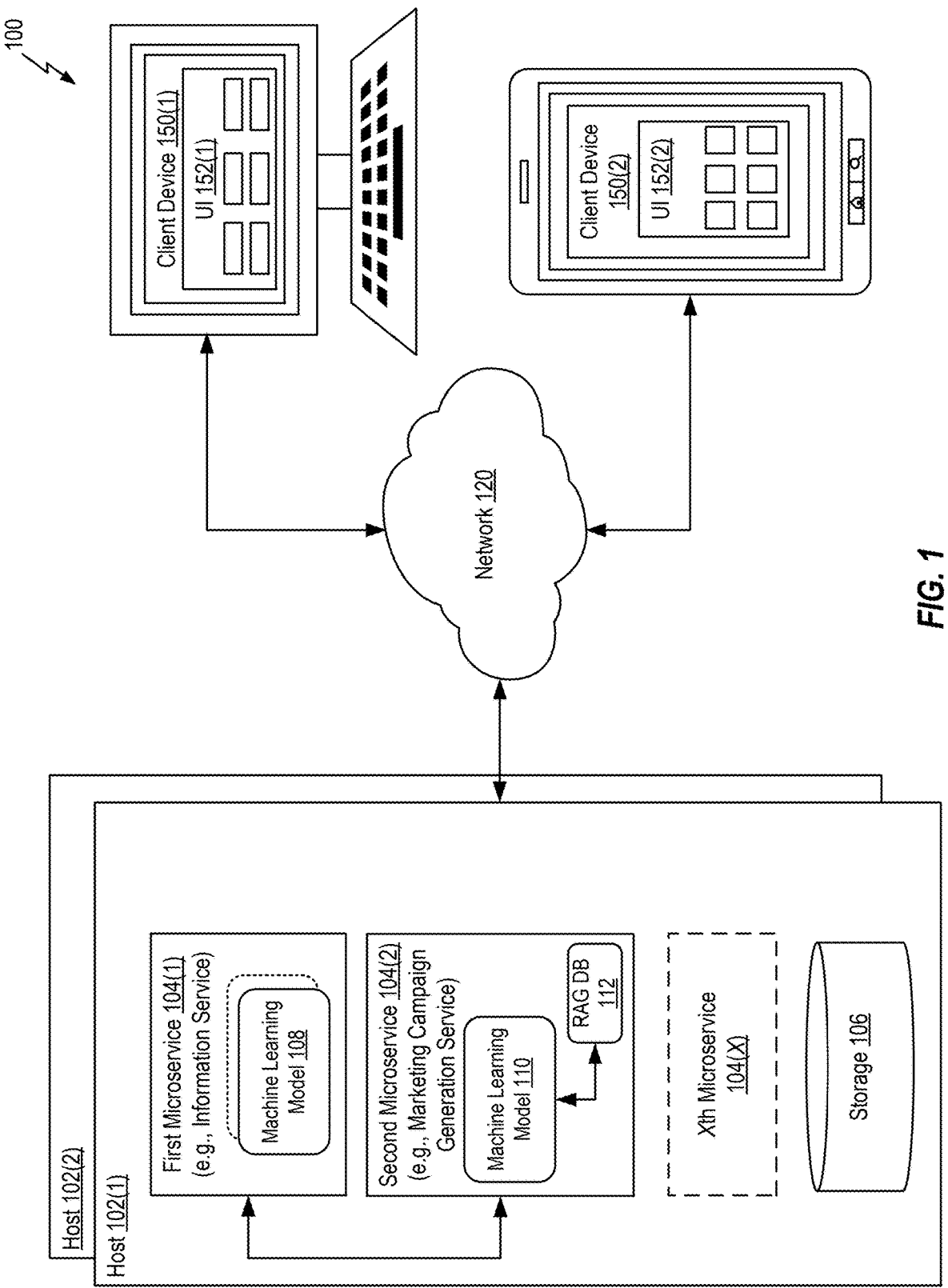
FIG. 1 depicts an example system implementing an enhanced object detection service.

Aspects of the present disclosure provide apparatuses, methods, processing systems, and computer-readable mediums for detecting an object (e.g., a visual object) in a multi-modal content. Multi-modal content refers to integration of multiple forms of media or modes of communication-such as text, images, audio, video, animations, and interactive elements-into a single piece of content. Examples of forms or modes include: text (written explanations, descriptions, articles, blogs, etc.), images (photographs, illustrations, infographics, etc.), audio (podcasts, sound effects, music, narration, etc.), video (instructional or entertainment videos), and interactive elements (buttons, hyperlinks, quizzes, polls, interactive maps, virtual reality (VR), augmented reality (AR), etc.). Certain aspects utilize retrieval augmented generation (RAG) and a language model (LM) prompting system.

The aspects described herein enhance the precision of object detection through a multi-layered approach to detecting a visual object in an image. Initially, a multi-modal machine learning (ML) model (e.g., a multi-modal large language model (MLLM)) receives as input an image depicting various objects (e.g., visual objects) and generates an output based on the image. For example, the generated output may identify the objects and narrate a general scene of the image, while flagging any visual object of uncertain identity or incongruent with the general scene. Based on the generated output, embeddings of the flagged visual object may be generated from various neural network layers and compared with embeddings of known visual objects. The embeddings of known visual objects may be retrieved from a data repository (e.g., a RAG database (DB)). The embeddings of known visual objects that satisfy a similarity threshold with the embeddings of the flagged visual object may be used to enrich the context with which to prompt the ML model for accurately identifying the flagged visual object. The RAG DB provides the ML model access to external datasets (e.g., contextual information not encoded in the training data of the ML model). Information related to the retrieved embeddings (e.g., images of similar visual objects) may be provided to the ML model as part of an enhanced prompt, and the ML model may determine a most probable identity of the flagged visual object based on the enhanced prompt and by leveraging its extensive training (e.g., on diverse Internet data).

Several technical problems or challenges of an MLLM are addressed by the aspects of the present disclosure. Although a pre-trained model (e.g., a pre-trained MLLM) is able to perform a variety of tasks based on the knowledge it learns from training data, the model may nevertheless lack specific knowledge that is not encoded in the training data. For example, a general-purpose MLLM (e.g., off-the-shelf MLLM) pre-trained on publicly-available data may not be able to respond, or may respond incorrectly, to certain types of prompts, such as a prompt requesting that the MLLM identify a visual object that is related to a specific knowledge domain (e.g., neuroscience, etc.) and not generally or publicly available.

Certain aspects described herein effectively resolve the issue of pinpointing and categorizing objects that lack clear visual identification in images. This is a common challenge in situations involving poor image quality (such as blurriness) or highly specialized knowledge domains (such as related to rare species or specific technological equipment). Conventional object detection technologies often struggle to accurately process the objects in such images due to limited training data that actually cover these niche situations or inherent limitations in discerning fine details in low-resolution images. These technical challenges can lead to significant inaccuracies, limiting the applicability and reliability of automated systems in fields where accurate object identification is critical (e.g., in biological research, specialized construction tasks, or detailed scientific studies where distinct but visually obscure objects need to be recognized and classified correctly). For example, an automated generation of marketing campaign materials (also referred to herein as marketing campaigns) that incorporate images may rely on accurately processing (e.g., detecting or identifying) the content of the images.

Aspects described herein overcome the aforementioned technical problems or challenges, for example, through an enhanced object detection. A solution provided by certain aspects of the present disclosure includes prompting an ML model (e.g., a pre-trained MLLM) to describe a multi-modal content such as that including an image as a form/mode, where an object (e.g., a visual object) in the image may be unidentified. The solution further includes generating one or more embeddings of the unidentified visual object, comparing the embeddings of the unidentified visual object with a plurality of embeddings of various known visual objects in order to identify one or more "most similar" embeddings of known visual objects. The ML model may then be prompted to identify the (previously) unidentified visual object based on, for example, an enhanced context related to the image, where the enhanced context includes information related to one or more known visual objects that are most similar to the (previously) unidentified visual object.

The enhanced object detection described herein integrates both "bottom-up" processing and "top-down" processing for object detection. As part of the bottom-up processing, a (e.g., pre-trained) multi-modal LLM (MLLM) analyzes raw visual data to detect objects. For uncertain or contextually incongruent detections, the enhanced object detection described herein performs the top-down processing to enrich the analysis of raw visual data with context and prior knowledge. For example, the analysis of raw visual data may be enriched using a database of information related to similar objects. Such enhanced object detection facilitates accurate object detection and identification by leveraging historical data and broader contextual insights. The accurate object detection and identification, even in niche knowledge domains, provides a practical application of the aspects of the present disclosure, which can be automatically incorporated and used, such as for generating marketing campaigns.

The enhanced object detection described herein provides various beneficial technical effects and/or advantages. In particular, certain aspects of the present disclosure enable improvements for an ML model in performing object detection. For example, the accuracy of prediction by the ML model in object detection is improved when the ML is prompted with context information that has been "enriched" or "enhanced" with information related to the similar objects, where the similar objects are identified based on their embeddings. Such enhanced context information in a prompt may allow an otherwise unidentifiable object to be accurately identified in an image, such as even when the ML model may not have been trained on an image of the unidentifiable object.

Generating embeddings of unidentified visual objects and of known visual objects from unstructured data (e.g., images) for context extraction in RAG enables the enhanced object detection with improved accuracy. Utilizing a RAG-based system on a comprehensive database of embeddings (e.g., of objects across diverse knowledge domains), aspects of the present disclosure can integrate various image distributions and elevate performance in detecting visual objects that may not necessarily be represented in this database. For example, even when a given visual object is not represented in the dataset with which an ML model may be pre-trained (e.g., for a certain knowledge domain), integrating the aforementioned strategies improves the accuracy of object detection by enhancing the context of the object detection with information from across diverse knowledge domains.

Example System Implementing an Enhanced Object Detection Service

FIG. 1 depicts an example system 100 supporting a plurality of microservices 104 (e.g., software-defined services, which in some cases, may be cloud-native). As shown in FIG. 1, system 100 includes client devices 150(1)-(2) (collectively referred to herein as "client devices 150") and hosts 102(1)-(2) (collectively referred to herein as "hosts 102") interconnected through a network 120. Network 120 may be, for example, a direct link, a local area network (LAN), a wide area network (WAN), such as the Internet, another type of network, or a combination of one or more of these networks.

Hosts 102 may be geographically co-located servers on the same rack or on different racks in any arbitrary location in a data center. Hosts 102 may be constructed on a server grade hardware platform and include components of a computing device such as, one or more processors (central processing units (CPUs)), one or more memories (random access memory (RAM)), one or more network interfaces (e.g., physical network interface cards (PNICs)), storage 106, and other components (e.g., only storage 106 is shown in FIG. 1).

A first host 102(1) in system 100 may host a plurality of microservices 104(1)-(X) (collectively referred to herein as "microservices 104"), where X is an integer greater than one. The microservices 104 may be deployed using virtual machines (VMs) and/or container(s) running on first host 102(1) (e.g., where first host 102(1) is running a hypervisor (not shown) used to abstract processor, memory, storage, and networking resources of first host 102(1)'s hardware platform). Generally, microservices 104 are loosely coupled and independently deployable services (or software) that may make up an application. Microservices 104 may enable segmented, granular level functionalities within a larger system infrastructure.

Client device 150(1) and client device 150(2) may each include a user interface (UI) 152(1), 152(2), respectively, which may be used to communicate with, at least, a first microservice 104(1) and/or another microservice 104, through the X-th microservice 104(X) using the network 120. For example, communication between client devices 150 and a microservice 104 may be facilitated by one or more application programming interfaces (APIs). Examples of client devices 150 may include a smartphone, a personal computer, a tablet, a laptop computer, and/or other devices.

As shown in FIG. 1, in certain aspects, the first microservice 104(1) implements an information service, which is any network 120 accessible service that maintains customer data (e.g., such as for customer relationship management, etc.), marketing data, and/or other data types. For example, the information service may include Mailchimp®. In certain aspects, the information service stores its data in storage 106.

In certain aspects, the first microservice 104(1) implements one or more domain-specific or task-specific models 108 (simply referred to herein as "model(s) 108"). In certain aspects, the model(s) 108 include language models, such as large language models (LLMs) or small language models (SLMs). First microservice 104(1) may implement the language models to provide responses to user prompts, including responses such as answers, advice, and/or help with the preparation of documents and/or reports. For example, Mailchimp®, an example information service, may utilize a language model to aid users of the application with preparing one or more marketing documents, such as including marketing campaign narratives (also referred to herein as marketing campaigns). The language model may provide answers to questions asked by a user of the application, prepare and output one or more reports and/or documents for the user, etc. In certain aspects, the language models implemented by first microservice 104(1) may include language models that are each individually fine-tuned for a particular domain and/or fine-tuned to perform a specific task. An example workflow of marketing campaign generation, such as by using first microservice 104(1), is described herein with respect to FIG. 7.

As an illustrative example, one language model may be fine-tuned for the biological research domain, such that the language model is capable of generating biological research-focused text and/or initiating or performing marketing-specific tasks (e.g., such as preparing a marketing campaign narrative incorporating the description of a detailed biological research-related image, etc.). Another language model implemented by first microservice 104(1) may be fine-tuned to generate specialized construction task-focused text and/or fine-tuned to initiate or perform specialized construction industry-specific tasks.

In certain aspects, the second microservice 104(2) implements an enhanced object detection service. The enhanced object detection service may be a service that is used to detect objects (e.g., visual objects) in a multi-modal content (e.g., including an image as a form/mode). The enhanced object detection service implements an ML model 110 that interacts with a RAG DB 112 (e.g., storing a plurality of embeddings of known visual objects, as described with respect to FIG. 2). In certain aspects, the ML model 110 includes a multi-modal language model, such as an MLLM. Second microservice 104(2) may implement the MLLM to provide responses to user prompts, including responses such as identification of a visual object in an image, where the MLLM is adaptable for various applications or knowledge domains. The enhanced object service may provide a solution for improving model capability even in knowledge domains that are not well-represented within the model's training data. An example workflow of enhanced object detection, such as by using second microservice 104(2), is described herein with respect to FIG. 2.

In certain aspects, second microservice 104(2) may make the ML model 110 available for subsequent use by first microservice 104(1).

Though FIG. 1 depicts each of first host 102(1), storage 106, client device 150(1), and client device 150(2) as single devices for ease of illustration, first host 102(1), storage 106, client device 150(1), and/or client device 150(2) may be embodied in different forms for different implementations. Further, though FIG. 1 depicts only two hosts 102 and two client devices 150, other examples may include more or fewer hosts 102 and/or client devices 150, and client devices 150 may use any combination of microservices 104 on any of the hosts 102 where microservices 104 are deployed.

Example Workflow of Enhanced Object Detection

Figure 2:
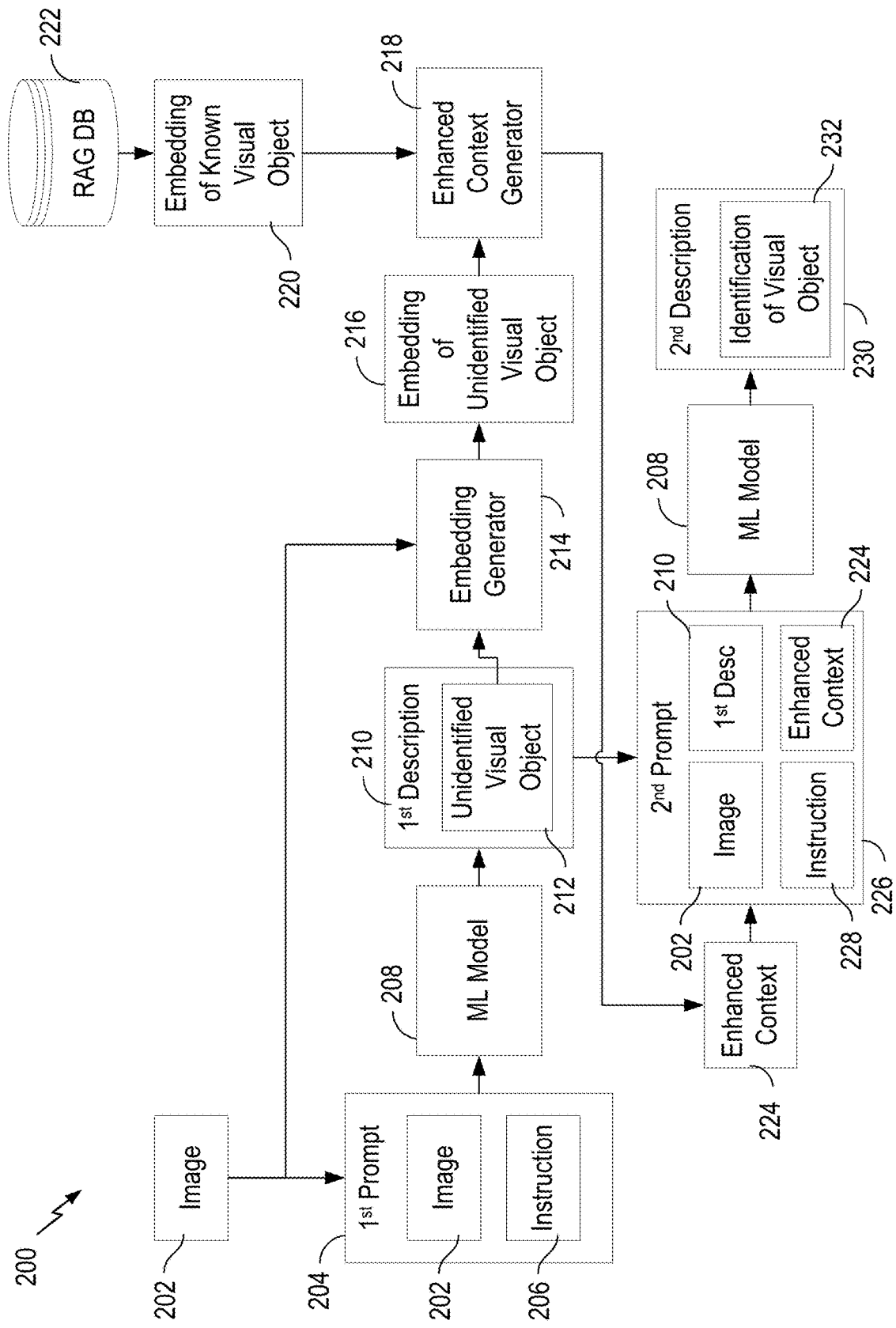
FIG. 2 depicts an example workflow for detecting an object in a multi-modal content with retrieval augmented generation and a language model prompting system.

FIG. 2 depicts an example workflow of an enhanced object detection system 200 for detecting an object (e.g., a visual object) in a multi-modal content (e.g., including an image as a form/mode) with RAG and an LM prompting system. In certain aspects, the example workflow may be performed using the second microservice 104(2) described with respect to FIG. 1.

In the depicted example workflow, an image 202 is provided as input for detecting a visual object. The image 202 is provided as part of a first prompt 204, which also includes an instruction 206, provided as input to an ML model 208. As used herein, the designation of "first," "second," etc. indicates that the components that follow such designation may be different components, and not necessarily an order of a component relative to each other, unless specifically indicated otherwise. The instruction 206 may instruct the ML model 208 to output a description regarding the image 202, such as including identification of objects (e.g., visual objects) included in the image 202. In certain aspects, the ML model 208 may be a multi-modal model (e.g., an MLLM such as a pre-trained MLLM) that takes as input a multi-modal content such as that including an image and generates an output based on the multi-modal content. The ML model 208 may be pre-trained to perform object detection and to process input with visual content. As shown, the ML model 208 takes as input the first prompt 204 and generates a first description 210 as output. In the first description 210, the ML model 208 flags an unidentified visual object 212 (or more than one) in the first description 210. This process may be referred to herein as an initial object detection. The initial object detection involves analyzing the image 202 to identify and describe the visual objects detected to be present in a general scene depicted in the image 202. The ML model 208 may also output a labeled version of the image 202. The labeled image may include labels (e.g., of identifications) of various visual objects, bounding boxes around the visual objects, and confidence level indications (e.g., confidence scores) for the visual objects. A bounding box refers to a box (e.g., a rectangular or square-shaped box) around an object in an image that defines the object's location and/or size. Bounding shapes may be any sort of shape, such as any polygon or circular shape, in various implementations. The ML model 208 may recognize diverse visual features of the detected visual objects and categorize the detected visual objects accordingly.

The ML model 208 generates the first description 210 based on the detected visual objects. For example, the ML model 208 generates a textual description of the entire scene depicted in the image 202. This includes identifying and noting the detected visual objects and their spatial relationships, providing a comprehensive narrative of the entire scene depicted in the image 202. The ML model 208 evaluates the certainty of each detected visual object's classification and its contextual fit within the scene. For example, the ML model 208 determines a confidence level (or score) associated with each detected visual object. In some cases, the ML model 208 may be prompted to determine a contextual fit of each detected visual object. Visual objects associated with low confidence levels (e.g., not satisfying a confidence level threshold) and/or those that are determined to be contextually misplaced (e.g., a fish in a grassy field scene) may be flagged for further analysis. The unidentified visual object 212 may be among such flagged visual objects. An example of generating the first description 210, which flags the unidentified visual object 212, is described herein with respect to FIGS. 3A and 5.

An embedding generator 214 receives the unidentified visual object 212 and generates a first embedding 216 (of the unidentified visual object 212). The first embedding 216 is provided to an enhanced context generator 218 to be compared with a second embedding 220 (of a known visual object) from a RAG DB 222. A plurality of embeddings (e.g., tagged embeddings) of known visual objects may be indexed and stored in the RAG DB 222 that allows for data retrieval. For example, a plurality of known visual objects may be used, for example by an ML model, to generate a plurality of respective embeddings representative of the plurality of known visual objects. An embedding of a known visual object may be a vector of various features or attributes of the known visual object, such as that output from a layer of a neural network model. The RAG DB 222 may index and store the plurality of respective embeddings representative of the plurality of known visual objects. In some cases, each embedding corresponding to a respective known visual object may be stored by the RAG DB 222 as a vector, along with metadata related to the respective known visual object (e.g., a label, a category, a source image, or a bounding box). The embeddings stored by the RAG DB 222 may be output from intermediate or final layers of a neural network model (e.g., a visual neural network model). At least some of these embeddings may capture visual features such as texture, shape, or semantic identity. In certain cases, the RAG DB 222 may support a similarity search using methods like cosine similarity, dot product, or Euclidean distance, and may use approximate nearest neighbor algorithms such as Hierarchical Navigable Small World (HNSW) or Inverted File (IVF).

As shown in FIG. 2, the embedding generator 214 uses the image 202 to generate the first embedding 216 in some cases. For example, the embedding generator 214 generates the first embedding 216 by cropping the image 202 based on a bounding box of the unidentified visual object 212 (e.g., as included in the output of the ML model 208 described above) and processing the cropped image to generate the first embedding 216. An example of generating the first embedding 216 is described herein with respect to FIG. 4A.

The enhanced context generator 218 receives the first embedding 216 (from the embedding generator 214) and the second embedding 220 (from the RAG DB 222) and generates an enhanced context 224. The RAG DB 222 may be queried to retrieve one or more embeddings of known visual objects that are the most similar (e.g., visually similar) to the unidentified visual object 212. For example, in response to receiving a query, a data retrieval component of the RAG DB 222 may work to select and return one or more embeddings of known visual objects that are the most similar to the unidentified visual object 212. In some cases, these embeddings of known visual objects may be sorted based on similarity, where embeddings of a number of most similar visual objects may be used to generate the enhanced context 224. These embeddings of the most similar known visual objects can be retrieved by using vector comparison techniques to identify the embeddings of known visual objects that satisfy a similarity threshold. As used herein, the similarity threshold refers to a threshold level of similarity between the first embedding 216 (of the unidentified visual object 212) and an embedding of a known visual object, where the first embedding and the embedding of the known visual object may be compared based on an embedding comparison method using Euclidean distance, cosine similarity, dot product, etc.

The enhanced context 224 generated by the enhanced context generator 218 may include one or more images (and their labels) of known visual objects that are associated with the embeddings of known visual objects that are the most similar to the unidentified visual object 212 retrieved from the RAG DB 222. In some cases, the RAG DB 222 may also return, and the enhanced context generator 218 may retrieve, metadata associated with the embeddings of known visual objects that are the most similar to the unidentified visual object 212. For example, when the unidentified visual object 212 is a part of a brain (e.g., as described herein with respect to an example depicted in FIG. 3B), a portion of metadata (e.g., a label) associated with an embedding retrieved from the RAG DB 222 and added as part of the enhanced context 224 may be "a pink jellyfish in the ocean." In certain cases, there may be more than one RAG DB 222, where the multiple RAG DBs may separately store (and independently handle) different embedding types (e.g., as output from different layers of a neural network model). An example of generating the enhanced context 224 is described with respect to FIG. 3B. Another example of generating the enhanced context 224, such as including comparing the embedding 216 with embeddings of known visual objects, is described with respect to FIG. 4B.

A second prompt 226, including the image 202, the first description 210, the enhanced context 224, and a second instruction 228, is then provided as input to the ML model 208. The ML model 208 generates as output a second description 230, which includes an identification 232 (of the unidentified visual object 212). An example of generating the second description 230 is described with respect to FIG. 6.

Figure 3A:
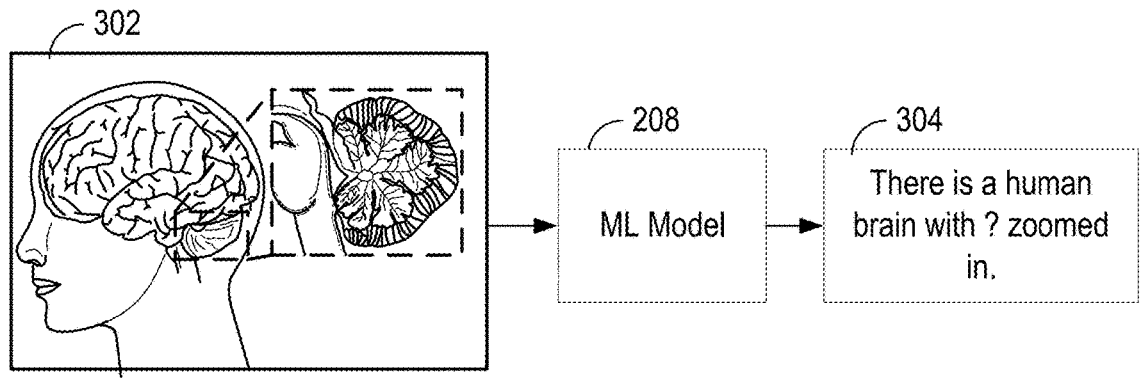
FIG. 3A depicts an example of initial object detection described with respect to FIG. 2.

FIG. 3A depicts an example of initial object detection described with respect to FIG. 2. An image 302 is an example of the image 202 described with respect to FIG. 2. In the depicted example of FIG. 3A, the image 302 illustrates a few visual objects. The image 302 illustrates a shape of a human head with a brain illustrated with some detail. A portion of the brain is zoomed in and shown in a separate view that illustrates additional details of that portion. In an initial object detection described with respect to FIG. 2, the ML model 208 takes as input the image 302 and generates a description 304 based on the image 302. As depicted, the description 304 includes a narrative of the content of the image 302: "There is a human brain with ? zoomed in." For example, the ML model 208 may detect the portion of the brain that is zoomed in and provide an identification of that portion with a confidence level that does not satisfy a confidence level threshold (e.g., where the confidence level may be below a defined threshold level). Due to the confidence level of the identification of the zoomed-in portion not satisfying the confidence level threshold, the ML model 208 uses the character "?" in the description 304 to flag the zoomed-in portion as an unidentified visual object. Other methods of flagging the unidentified visual object are also possible, such as using one or more different characters in the narrative of the description 304.

Figure 3B:
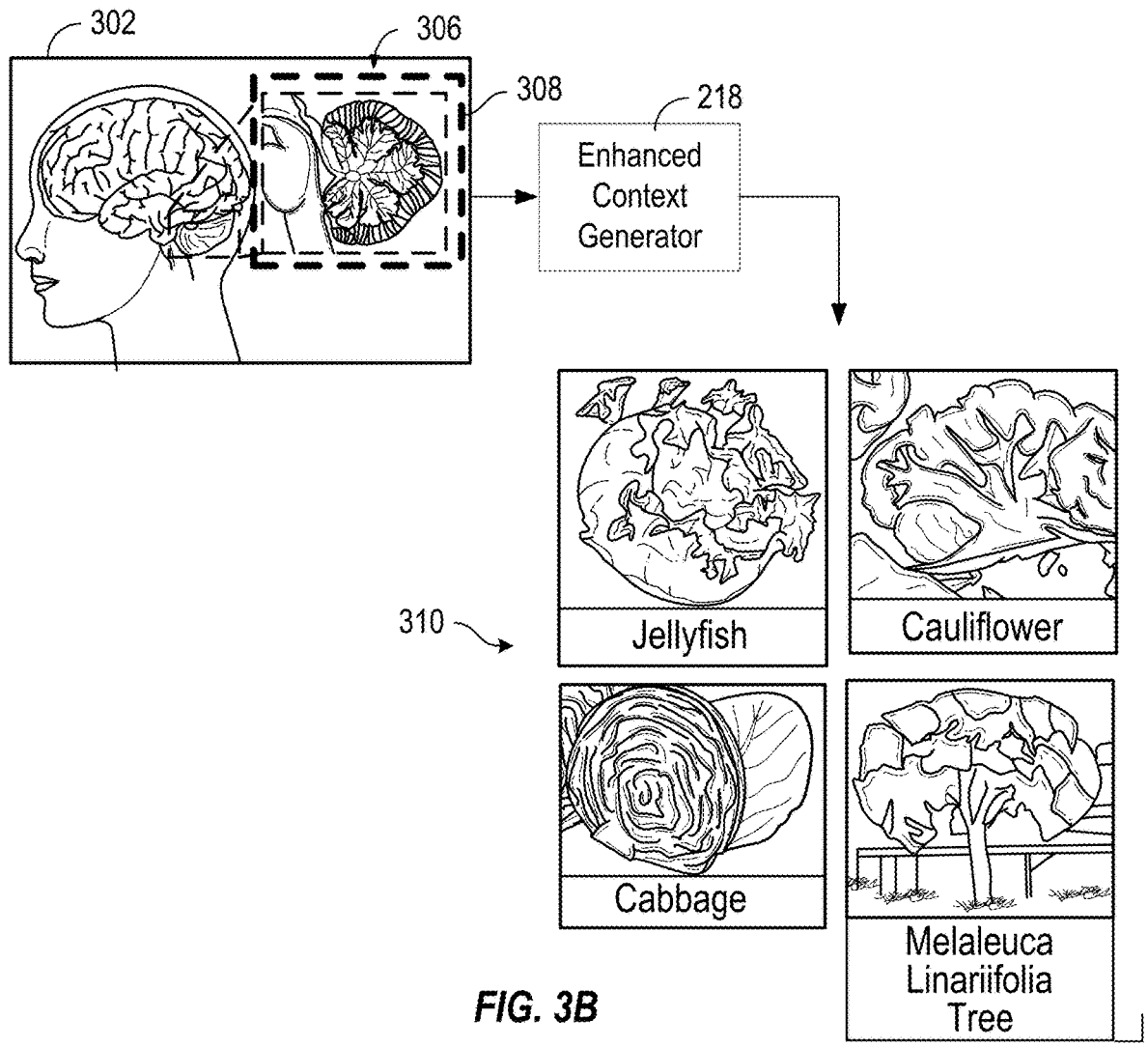
FIG. 3B depicts an example of enhanced context generation described with respect to FIG. 2.

FIG. 3B depicts an example of enhanced context generation described with respect to FIG. 2. In the depicted example of FIG. 3B, a portion 306 (corresponding to the zoomed-in portion of the image 302), including a bounding box 308 around the zoomed-in portion, is determined, for example, by the ML model 208 during the initial object detection. As described with respect to FIG. 2, the image 302 may be cropped based on the bounding box 308 to include the portion 306, and the cropped image is provided as input to the enhanced context generator 218. The enhanced context generator 218 provides as output a plurality of similar objects 310 (including their labels). The plurality of similar objects 310 may be provided based on a plurality of embeddings retrieved from a RAG DB (e.g., the RAG DB 222 of FIG. 2). For example, the plurality of embeddings may be identified and retrieved from the RAG DB 222 as embeddings of known visual objects that are the most similar to the object included in the portion 306 of the image 302 based on an embedding comparison. In the depicted example of FIG. 3B, a jellyfish, a cauliflower, a cabbage, and a *Melaleuca linariifolia* tree are identified as visual objects that are similar to the object included in the portion 306 of the image 302, to be used for enhanced context generation. While certain ones of the identified similar (e.g., visually similar) objects may not belong to the same knowledge domain as the flagged visual object, they can still improve the identification of the flagged visual object. This is due to the vast corpora of training data on which a language-based model, such as an LLM (such as used for the ML model 208), can be trained. Such training data may encompass diverse visual data and/or textual data from across various knowledge domains (e.g., from the Internet). As a result, the ML model 208 (e.g., trained on such training data) may have a robust ability to reason over conceptual and visual similarities-even across different knowledge domains. When an embedding of the flagged visual object itself or an embedding of a similar object is absent from the RAG DB (e.g., the RAG DB 222), retrieving embeddings of visually and/or conceptually similar objects may still provide a valuable descriptive context. This context (e.g., as part of the enhanced context 224) can guide the ML model 208 in generating accurate interpretations or predictions, leveraging associative knowledge encoded in the ML model 208's training data described above. Thus, a semantic or perceptual similarity (e.g., even without a strict domain overlap) may enable the enhanced object detection or identification described herein.

Figure 4A:
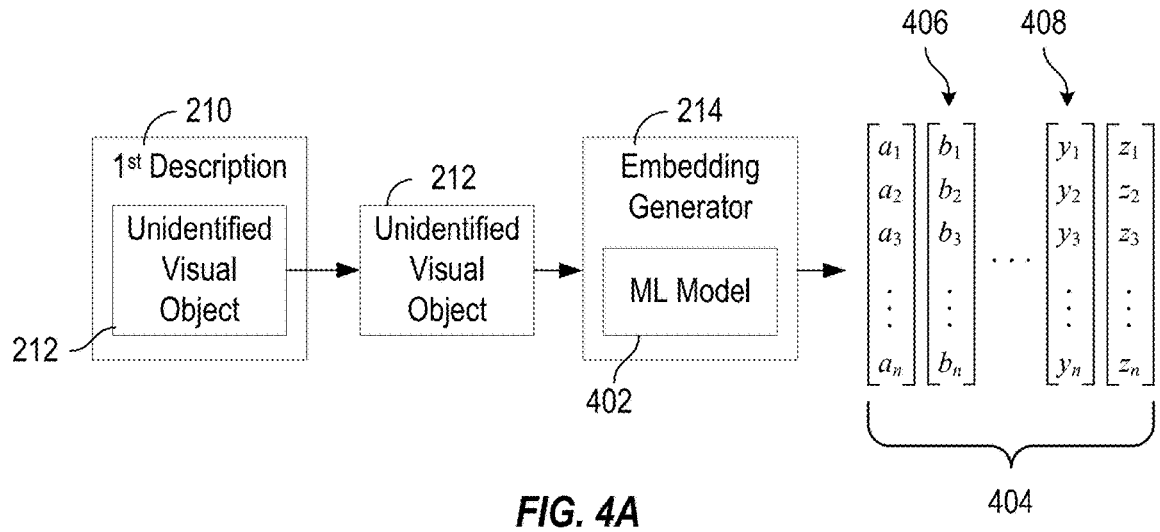
FIG. 4A depicts an example of embedding generation of an unidentified visual object described with respect to FIG. 2.

FIG. 4A depicts an example of embedding generation of an unidentified visual object described with respect to FIG. 2. As depicted, the unidentified visual object 212 of the first description 210 is provided as input to the embedding generator 214. In the depicted example of FIG. 4A, the embedding generator 214 includes an ML model 402 (e.g., using a neutral network such as a convolutional neural network (CNN)) that generates a neural network representation of the unidentified visual object 212. For example, the ML model 402 may generate outputs from a plurality of layers 404 (representing various visual features or attributes), including a first layer 406 and a second layer 408. The first layer 406 may be a shallow layer, and a second layer 408 may be a deep layer. A shallow layer embedding (e.g., an embedding output from a shallow layer) refers to an embedding extracted from an earlier convolutional layer (e.g., closer, than a deep layer, to an input layer corresponding to an input image) of a neural network that captures low-level visual features such as edges, colors, textures, or basic shapes. A deep layer embedding (e.g., an embedding output from a deep layer) refers to an embedding extracted from a later hidden or fully connected layer of the neural network that encapsulates more abstract, higher-level features, such as object classes, semantic relationships, or conceptual attributes (e.g., identifying the presence of a specific object, such as an animal, rather than its edges). For example, a shallow layer embedding primarily captures basic visual elements, such as the color pattern or texture of an animal's fur, or simple geometric contours (like edges or corners). A deep layer embedding encapsulates abstract features like the recognition of the animal species (e.g., identifying it as a cat), its pose, or contextual relationships within a broader scene. In some cases, deep layer embeddings provide a valuable point of similarity beyond (e.g., low-level) visual features. Deep layers encode abstract, semantic-like features, such as essentially what a model has learned an object is. When two objects have similar embeddings as output from these deep layers, it may indicate that these objects share high-level conceptual or functional characteristic(s). For example, they may belong to similar categories or superclasses (e.g., "sea creatures") or share contextual roles (e.g., "used for food"). These associations reflect patterns learned during training and can support the improved object detection or identification of objects (e.g., the flagged visual objects) described herein, even when a direct visual resemblance to a known visual object may be limited.

Figure 4B:
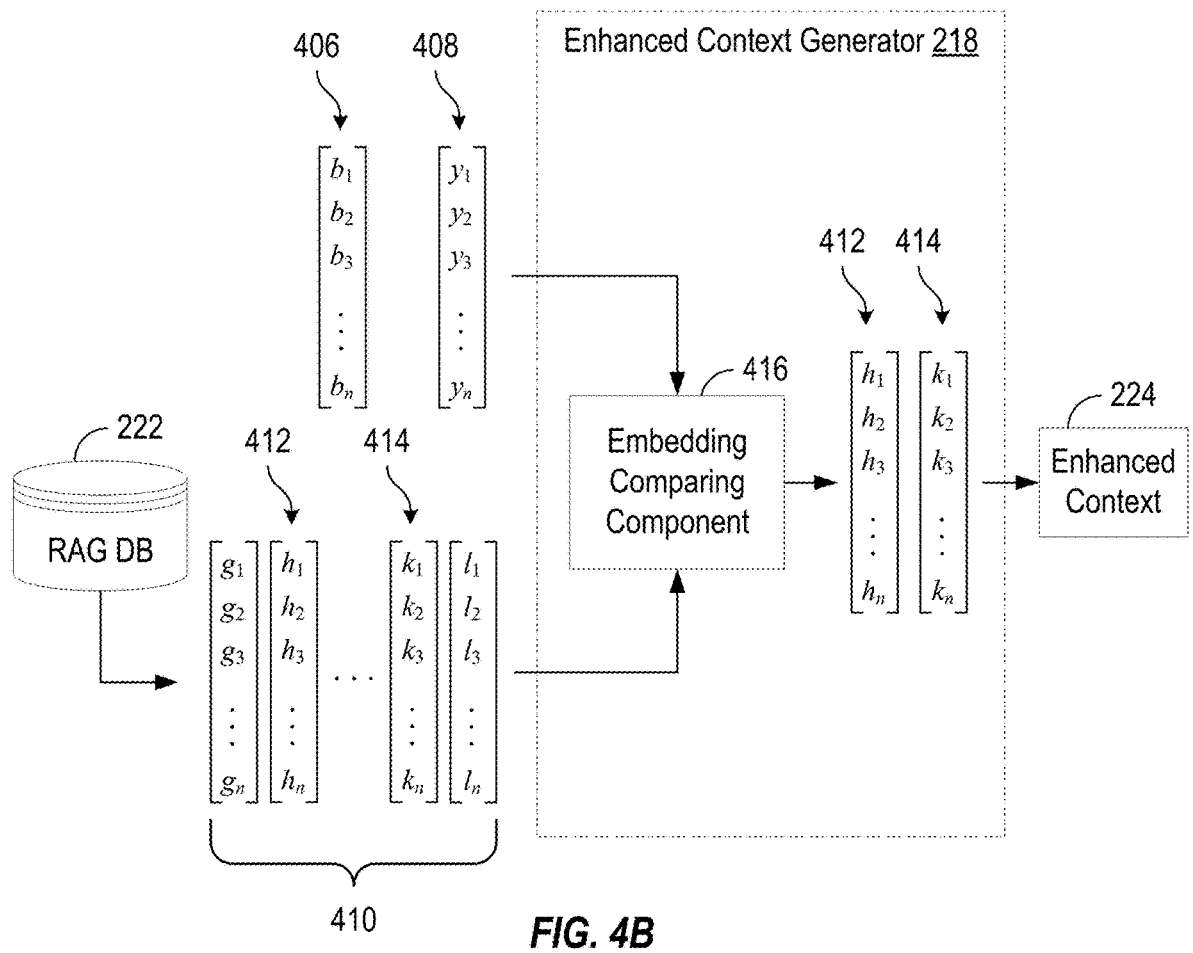
FIG. 4B depicts an example of enhanced context generation described with respect to FIG. 2.

FIG. 4B depicts an example of enhanced context generation described with respect to FIG. 2. In the depicted example of FIG. 4B, the outputs from the first layer 406 and the second layer 408 are compared with a plurality of embeddings, including those output from a plurality of layers 410 and corresponding to a known visual object, retrieved from the RAG DB 222. While only the plurality of layers 410 are shown, additional sets of embeddings may be retrieved from the RAG DB 222 and compared with the outputs from the first layer 406 and the second layer 408, such as described with respect to FIG. 2.

As shown, the enhanced context generator 218 includes an embedding comparing component 416 that compares the embeddings output from the first layer 406 and the second layer 408 with, respectively, the embeddings output from a third layer 412 and a fourth layer 414, extracted from the corresponding layers (e.g., a shallow layer and a deep layer, respectively) of the plurality of layers 410. The embeddings output from the first layer 406 and the second layer 408 (of the unidentified visual object 212) may be compared with, respectively, the embeddings output from the third layer 412 and the fourth layer 414 (of the known visual object) based on an embedding comparison method using Euclidean distance, cosine similarity, dot product, etc. The embedding comparing component 416 may determine that the embeddings output from the third layer 412 and the fourth layer 414 meet a defined similarity threshold, and the enhanced context generator 218 may identify the known visual object, based on which the embeddings output from the third layer 412 and the fourth layer 414 are generated, as being sufficiently similar (e.g., visually) to the unidentified visual object 212 to be included as part of the enhanced context 224 being generated.

In certain aspects, the embeddings as output from certain layers (e.g., two layers, such as a shallow layer and a deep layer) for, respectively, the unidentified visual object 212 and the known visual object may be compared. For example, the first layer 406 and the third layer 412 may be corresponding shallow layers, and the second layer 408 and the fourth layer 414 may be corresponding deep layers. The embedding output from the first layer 406 may be compared with the embedding output from the third layer 412, and the embedding output from the second layer 408 may be compared with the embedding output from the fourth layer 414. Comparing the embeddings as output from such distinct layers may allow different types of attributes (e.g., visual features and more abstract features (such as object classes, semantic relationships, or conceptual attributes)) to be compared. The distinct layers may correspond to distinct stages of object identification in a neural network model and capture different types of information. In some cases, comparing embeddings as output from such distinct layers (e.g., only such distinct layers, rather than all layers) may mitigate resource demands (e.g., attributable to storage and/or search overhead), while providing useful information for improved object identification.

Figure 5:
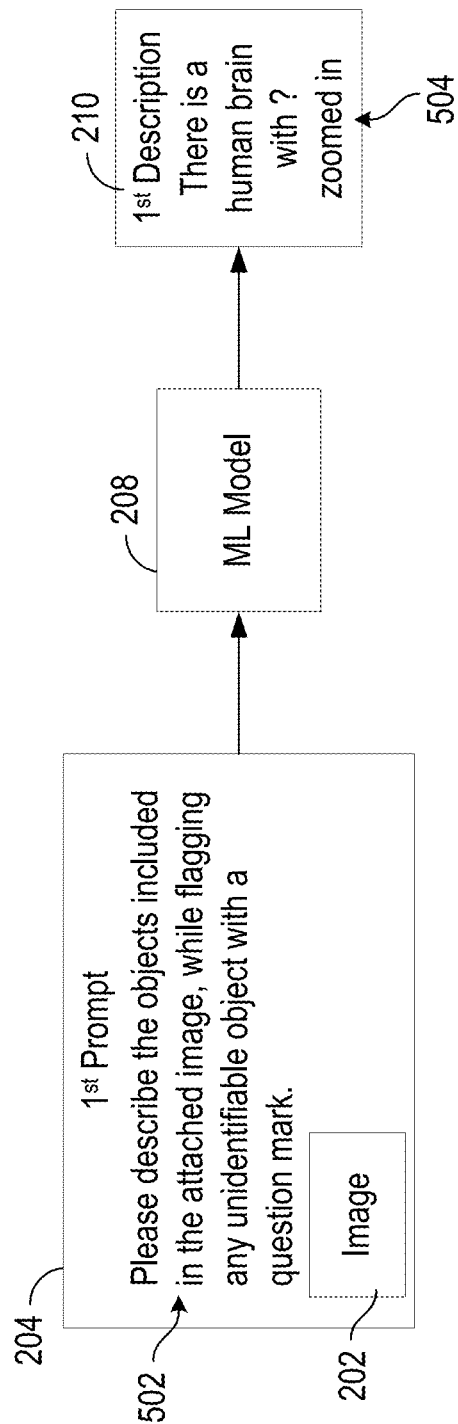
FIG. 5 depicts an example prompt for an initial object detection described with respect to FIG. 2.

FIG. 5 depicts an example of prompt for an initial object detection described with respect to FIG. 2. As depicted, the first prompt 204 includes an instruction 502 and the image 202 (e.g., the image 202 itself or an indication of where the image 202 may be obtained, such as a link to the location of the image 202). The ML model 208 receives as input the first prompt 204 and generates as output the first description 210 that includes a narrative 504, which describes a general scene of the image 202 while identifying and noting the detected visual objects ("human brain" and "?") and their spatial relationship ("with ? zoomed in").

Figure 6:
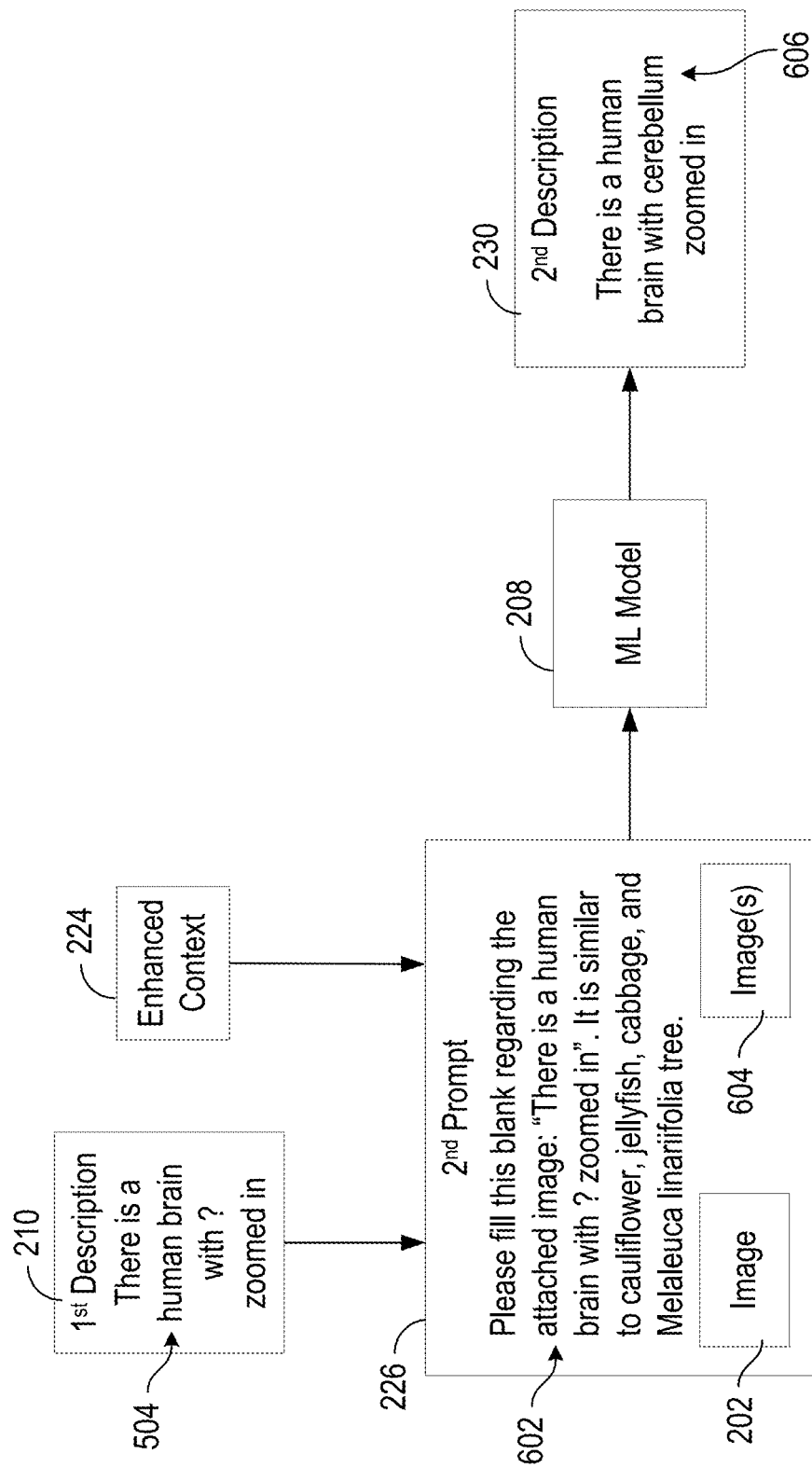
FIG. 6 depicts an example prompt for an enhanced object detection described with respect to FIG. 2.

FIG. 6 depicts an example of prompt for an enhanced object detection described with respect to FIG. 2. As depicted, the first description 210, including the narrative 504 (described with respect to FIG. 5: "There is a human brain with ? zoomed in") and the enhanced context 224, are used to generate the second prompt 226. The second prompt 226 includes an instruction 602 (including the narrative 504) along with the image 202 and one or more images 604 (of known visual object(s)). The instruction 602 is an example of the second instruction 228 described with respect to FIG. 2, where the narrative 504 included in the instruction 602 is an example of the first description 210 to be included as part of the second prompt 226 as described with respect to FIG. 2.

As depicted, the instruction 602 also includes information that is based on the enhanced context 224 related to known visual objects that are identified as being sufficiently similar to the unidentified visual object 212 as described with respect to FIG. 2 and FIG. 4B (e.g., "it is similar to cauliflower, jellyfish, cabbage, and *Melaleuca linariifolia* tree," where the cauliflower, jellyfish, cabbage, and *Melaleuca linariifolia* tree are the known visual objects that are identified as being sufficiently similar (e.g., visually) to the unidentified visual object 212). As shown, the second prompt 226 also includes the one or more images 604 of the similar known visual objects that provide additional context for the ML model 208. In some cases, the second prompt 226 may be an enhanced textual prompt that includes the instruction 602 with textual information related to the image 202 and the one or more images 604 (and not the image 202 and the one or more images 604 themselves). This prompt supplements the initial incomplete or uncertain information (e.g., of the narrative 504), furnishing a more detailed context to the ML model 208.

The ML model 208 receives as input the second prompt 226 and reassesses the flagged visual object (e.g., the unidentified visual object 212). The enhanced context provided in the second prompt 226 enables the ML model 208 to correctly infer the identification of the unidentified visual object 212 as "cerebellum." The second description 230 updates the scene description of the image 202 with the newly identified (or re-confirmed-if an initial classification, though uncertain at first, was correct) object classifications, ensuring an enhanced and accurate representation of the visual input of the image 202. For example, the second description 230 includes a new identification 606 of the unidentified visual object 212.

Example Workflow of a Marketing Campaign Generation

Figure 7:
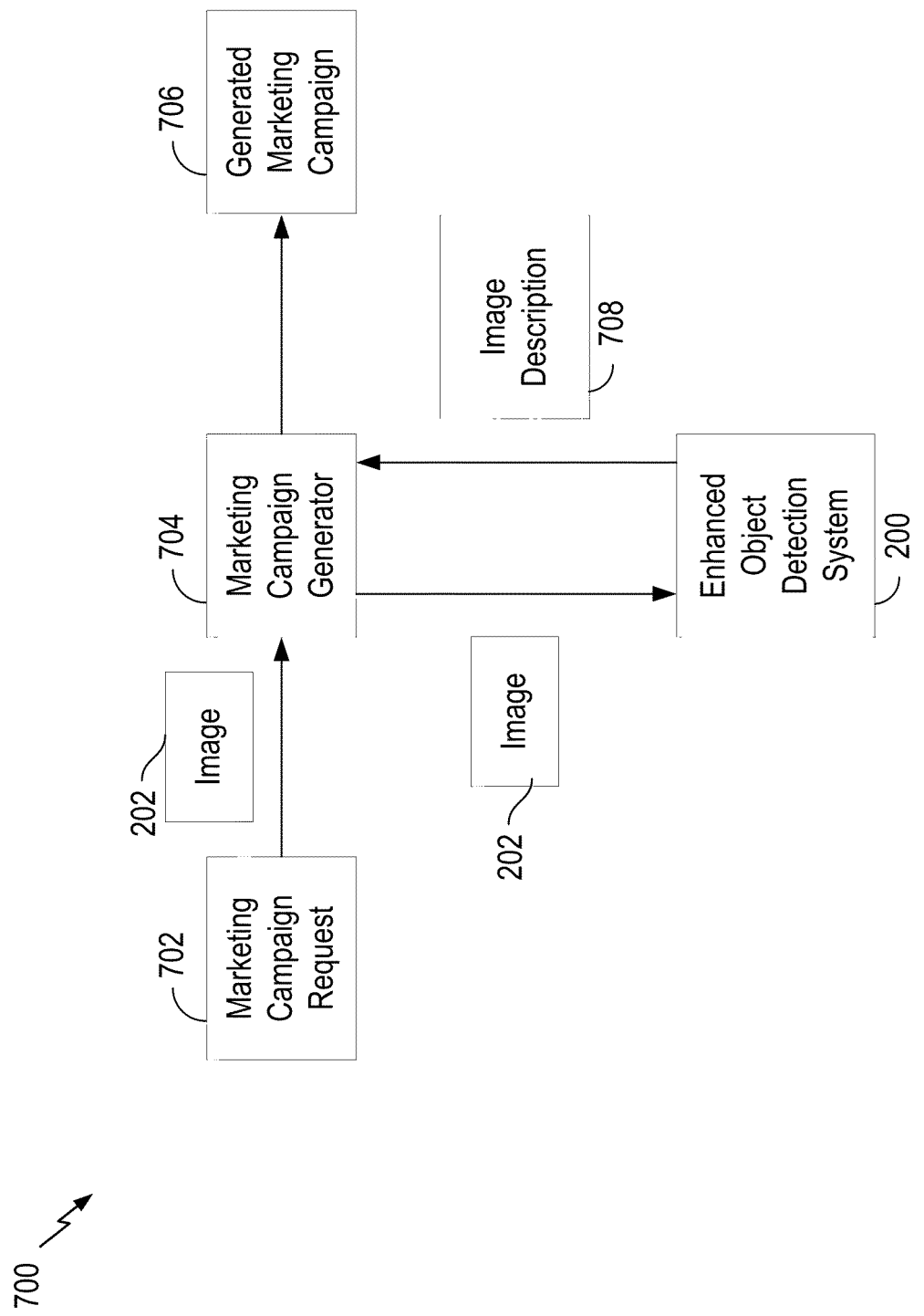
FIG. 7 depicts an example workflow of marketing campaign generation using the enhanced object detection described with respect to FIG. 2.

FIG. 7 depicts an example workflow 700 of marketing campaign generation using the enhanced object detection described with respect to FIG. 2. The marketing campaign generation described with respect to FIG. 7, while representing a practical application of the aspects described herein, is merely one example of use cases or applications of the enhanced object detection described herein, and other uses cases and/or applications are possible.

The example workflow 700 begins with a marketing campaign request 702. The marketing campaign request 702 provides the image 202 as input to a marketing campaign generator 704. The marketing campaign generator 704 provides as input the image 202 to the enhanced object detection system 200, described with respect to FIG. 2, and receives as output an image description 708. For example, the marketing campaign generator 704 may provide a request or an instruction to generate the image description 708 of the image 202. An example prompt corresponding to such request or instruction may be: "I am a private tutor for neuroscience. Please write me a suggestion for a new email campaign for pre-med students, while referencing the attached image in a seamless way (but not directly addressing it). It is best to use it as an analogy." This prompt may be provided with the image 202, such as the image 302 depicted in and described with respect to FIGS. 3A and 3B. The image 202 may include at least one visual object that is identified in an initial object detection with a confidence level that does not satisfy a confidence level threshold. The enhanced object detection system 200 generates the image description 708 including an identification of the unidentified visual object from the initial object detection, and provides the image description 708 to the marketing campaign generator 704. The marketing campaign generator 704 may incorporate the image description 708 into and provide, as output, the generated marketing campaign 706. An example of the generated marketing campaign 706 may be:

Subject: Sharpen Your Focus on Neuroscience with Our Specialized Tutoring Program!
Dear Future Medical Professionals,
Embarking on your journey through medical education requires a keen understanding of the human body.
Just as the cerebellum plays a critical role in fine-tuning motor activities, our specialized neuroscience tutorial program is designed to fine-tune your knowledge and understanding of neuroscience, preparing you for the challenges and rigor of medical school.
Our tutorial sessions delve deeply into the functional complexities of the brain, employing comprehensive analogies, detailed visual aids, and interactive learning techniques that ensure you not only understand but also retain what you learn. This approach provides a solid foundation, just as the cerebellum stabilizes and supports precise movements.
We're committed to equipping you with the tools and knowledge to excel. By joining our program, you better prepare yourself for the intricate studies ahead in your medical career. To help get you started, we offer a special introductory offer for all pre-med students who sign up this month.
Elevate your pre-med journey by mastering the complexities of neuroscience through our dedicated tutoring services. Enroll now and take the first step towards a successful and rewarding career in medicine.
Thank you for considering our specialized neuroscience tutorials as part of your educational path.
Best Regards,
[Your Name]
Neuroscience Tutor and Education Enthusiast In the example of the generated marketing campaign 706 provided above, "Just as the cerebellum plays a critical role in fine-tuning motor activities, our specialized neuroscience tutorial program is designed to fine-tune your knowledge and understanding of neuroscience," and "This approach provides a solid foundation, just as the cerebellum stabilizes and supports precise movements." correspond to the parts which reference the image (e.g., image 202) in the output of the enhanced object detection system 200.

Example Methods for Enhanced Object Detection

Figure 8:
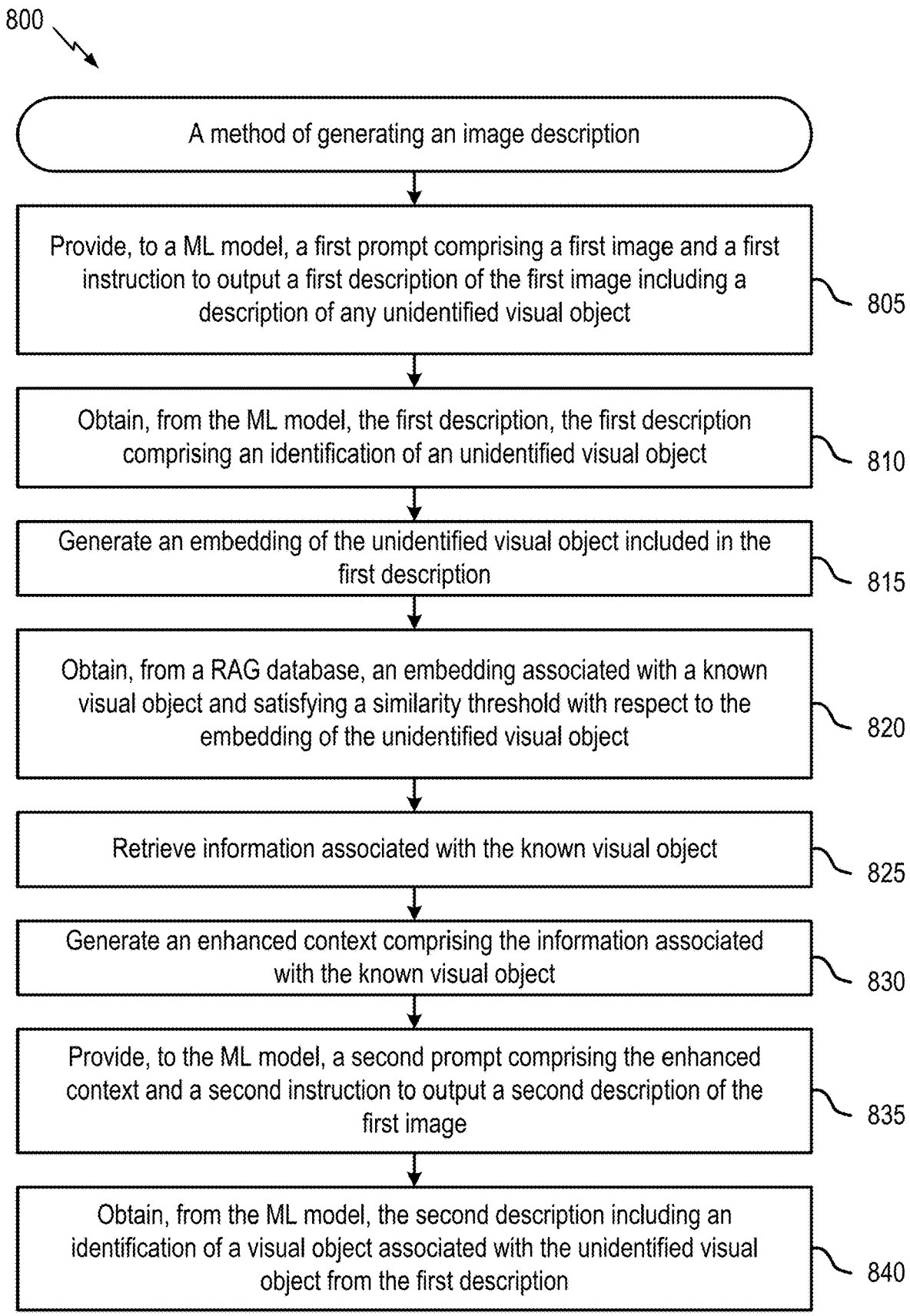
FIG. 8 depicts a method for generating an image description.

FIG. 8 depicts an example method 800 for enhanced object detection. In one aspect, method 800 can be implemented by the enhanced object detection system 200 of FIG. 2 and/or processing system 1000 of FIG. 10.

Method 800 begins at block 805 with providing, to a ML model, a first prompt comprising a first image and a first instruction to output a first description of the first image including a description of any unidentified visual object. The first prompt is an example of the first prompt 204 provided to the ML model 208 as described with respect to FIG. 2.

Method 800 then proceeds to block 810 with obtaining, from the ML model, the first description, the first description comprising an identification of an unidentified visual object. The first description is an example of the first description 210 generated by the ML model 208 as described with respect to FIG. 2.

Method 800 then proceeds to block 815 with generating an embedding of the unidentified visual object included in the first description. The embedding is an example of the first embedding 216 generated by the embedding generator 214 as described with respect to FIG. 2, where the unidentified visual object is an example of the unidentified visual object 212 described with respect to FIG. 2.

Method 800 then proceeds to block 820 with obtaining, from a RAG database, an embedding associated with a known visual object and satisfying a similarity threshold with respect to the embedding of the unidentified visual object. The RAG database is an example of the RAG DB 222 described with respect to FIG. 2, where the embedding associated with the known visual object and satisfying the similarity threshold is an example of the second embedding 220 described with respect to FIG. 2.

Method 800 then proceeds to block 825 with retrieving information associated with the known visual object. For example, the information associated with the known visual object may correspond to information (included in the enhanced context) related to one or more known visual objects that are most similar to the (previously) unidentified visual object, described with respect to FIG. 6.

Method 800 then proceeds to block 830 with generating an enhanced context comprising the information associated with the known visual object. The enhanced context is an example of the enhanced context 224 described with respect to FIG. 2. For example, the enhanced context may correspond to the enhanced context including information related to one or more known visual objects that are most similar to the (previously) unidentified visual object, described with respect to FIG. 6.

Method 800 then proceeds to block 835 with providing, to the ML model, a second prompt comprising the enhanced context and a second instruction to output a second description of the first image. The second prompt is an example of the second prompt 226 described with respect to FIG. 2.

Method 800 then proceeds to block 840 with obtaining, from the ML model, the second description including an identification of a visual object associated with the unidentified visual object from the first description. The second description is an example of the second description 230 described with respect to FIG. 2.

In some aspects, block 815 includes processing a second image of the unidentified visual object with another ML model to generate at least one of a shallow layer embedding of the unidentified visual object or a deep layer embedding of the unidentified visual object, the shallow layer embedding related to a first feature of the unidentified visual object and the deep layer embedding related to a second feature of the unidentified visual object that is more abstract than the first feature.

In some aspects, processing the second image of the unidentified visual object with the other ML model comprises providing, to the other ML model, an extracted portion of the first image including the unidentified visual object as determined by a bounding box around the unidentified visual object in the first image.

In some aspects, method 800 further includes obtaining, from the RAG database, a plurality of embeddings associated, respectively, with a plurality of known visual objects, each of the plurality of embeddings satisfying the similarity threshold with respect to the embedding of the unidentified visual object. In some aspects, method 800 further includes sorting the plurality of embeddings based on similarity with respect to the embedding of the unidentified visual object, wherein block 830 includes adding, to the enhanced context, information associated with a defined number of known visual objects of the plurality of known visual objects that are most similar to the unidentified visual object based on the sorting.

In some aspects, block 830 includes adding the first prompt to the enhanced context.

In some aspects, method 800 further includes outputting the second description to a system from which a request to generate a description of the first image is received.

In some aspects, method 800 further includes obtaining a request to generate a marketing campaign narrative related to the first image. In some aspects, method 800 further includes generating the marketing campaign narrative based on the second description.

In some aspects, the first description comprises one or more detected visual objects, in addition to the unidentified visual object, in the first image and a spatial relationship of the one or more detected visual objects with respect to the unidentified visual object.

In some aspects, the unidentified visual object is associated with a confidence level generated by the ML model that does not satisfy a confidence level threshold.

In some aspects, the first instruction further instructs the ML model to determine a contextual fit of the unidentified visual object with the first image.

Method 800 improves the accuracy of prediction by the ML model in object detection or identification by prompting the ML model with context information that has been "enriched" or "enhanced" with the similar objects (similar to an unidentified object), where the similar objects are identified based on their embeddings. Such enhanced context information in a prompt may allow an otherwise unidentifiable object to be accurately identified in an image, such as even when the ML model may not have been trained on an image of the unidentifiable object. Method 800 improves the object detection or identification by an ML model, for example, by generating and providing the enhanced context information described herein. In some cases, the ML model's performance in object detection or identification may be improved without a significant increase in resource demands (e.g., attributable to storage and/or search overhead) by comparing embeddings as output from certain distinct layers (e.g., only such distinct layers, rather than all layers).

Note that FIG. 8 is just one example of a method, and other methods including fewer, additional, or alternative operations are possible consistent with this disclosure.

Figure 9:
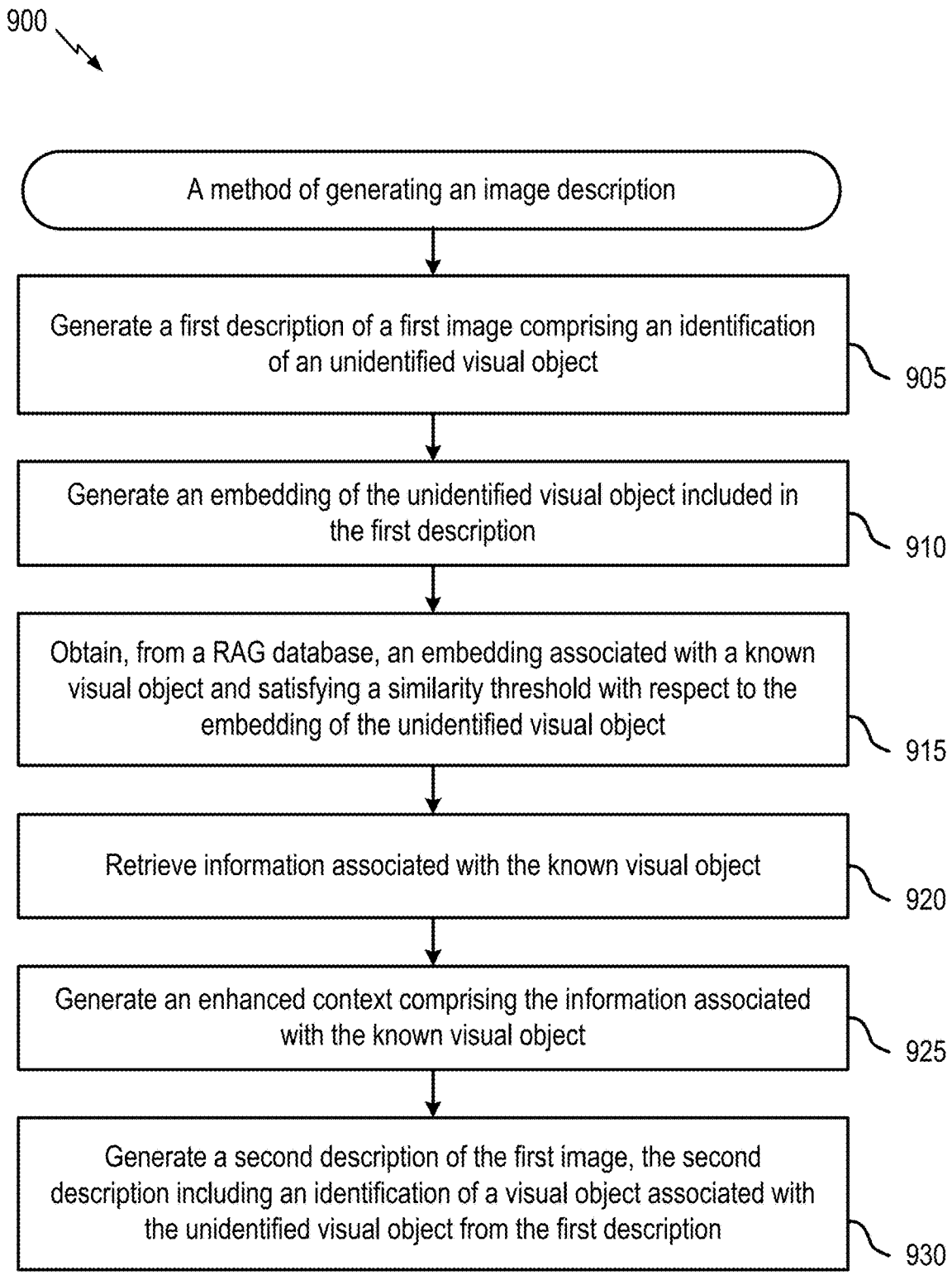
FIG. 9 depicts a method for generating an image description.

FIG. 9 depicts an example method 900 for enhanced object detection. In one aspect, method 900 can be implemented by the enhanced object detection system 200 of FIG. 2 and/or processing system 1000 of FIG. 10.

Method 900 begins at block 905 with generating a first description of a first image comprising an identification of an unidentified visual object. The first description is an example of the first description 210 generated by the ML model 208 as described with respect to FIG. 2.

Method 900 then proceeds to block 910 with generating an embedding of the unidentified visual object included in the first description. The embedding is an example of the first embedding 216 generated by the embedding generator 214 as described with respect to FIG. 2, where the unidentified visual object is an example of the unidentified visual object 212 described with respect to FIG. 2.

Method 900 then proceeds to block 915 with obtaining, from a RAG database, an embedding associated with a known visual object and satisfying a similarity threshold with respect to the embedding of the unidentified visual object. The RAG database is an example of the RAG DB 222 described with respect to FIG. 2, where the embedding associated with the known visual object and satisfying the similarity threshold is an example of the second embedding 220 described with respect to FIG. 2.

Method 900 then proceeds to block 920 with retrieving information associated with the known visual object. For example, the information associated with the known visual object may correspond to information (included in the enhanced context) related to one or more known visual objects that are most similar to the (previously) unidentified visual object, described with respect to FIG. 6.

Method 900 then proceeds to block 925 with generating an enhanced context comprising the information associated with the known visual object. The enhanced context is an example of the enhanced context 224 described with respect to FIG. 2. For example, the enhanced context may correspond to the enhanced context including information related to one or more known visual objects that are most similar to the (previously) unidentified visual object, described with respect to FIG. 6.

Method 900 then proceeds to block 930 with generating a second description of the first image, the second description including an identification of a visual object associated with the unidentified visual object from the first description. The second description is an example of the second description 230 described with respect to FIG. 2.

In some aspects, block 905 includes: providing, to a ML model, a prompt comprising the first image and an instruction to output the first description of the first image including a description of any unidentified visual object; and obtaining, from the ML model, the first description of the first image comprising the identification of the unidentified visual object, wherein the ML model is configured via training to generate the first description.

In some aspects, block 90 includes: providing, to a ML model, a prompt comprising the enhanced context and an instruction to output the second description of the first image; and obtaining, from the ML model, the second description including the identification of the visual object associated with the unidentified visual object from the first description, wherein the ML model is configured via training to generate the second description.

Method 900 provides a solution for adeptly managing the technical challenges of object detection or identification in complex or ambiguous visual scenarios, harnessing LM capabilities leveraging training on diverse training data and a RAG system. Method 900 overcomes such technical challenges for object detection or identification by an ML model, for example, by generating and providing the enhanced context information described herein. The ML model's performance in object detection or identification may be improved without a significant increase in resource demands (e.g., attributable to storage and/or search overhead) by limiting the embedding retrieval and comparison to embeddings as output from certain distinct layers (e.g., only such distinct layers, rather than all layers).

Note that FIG. 9 is just one example of a method, and other methods including fewer, additional, or alternative operations are possible consistent with this disclosure.

Example Processing System for Enhanced Object Detection

Figure 10:
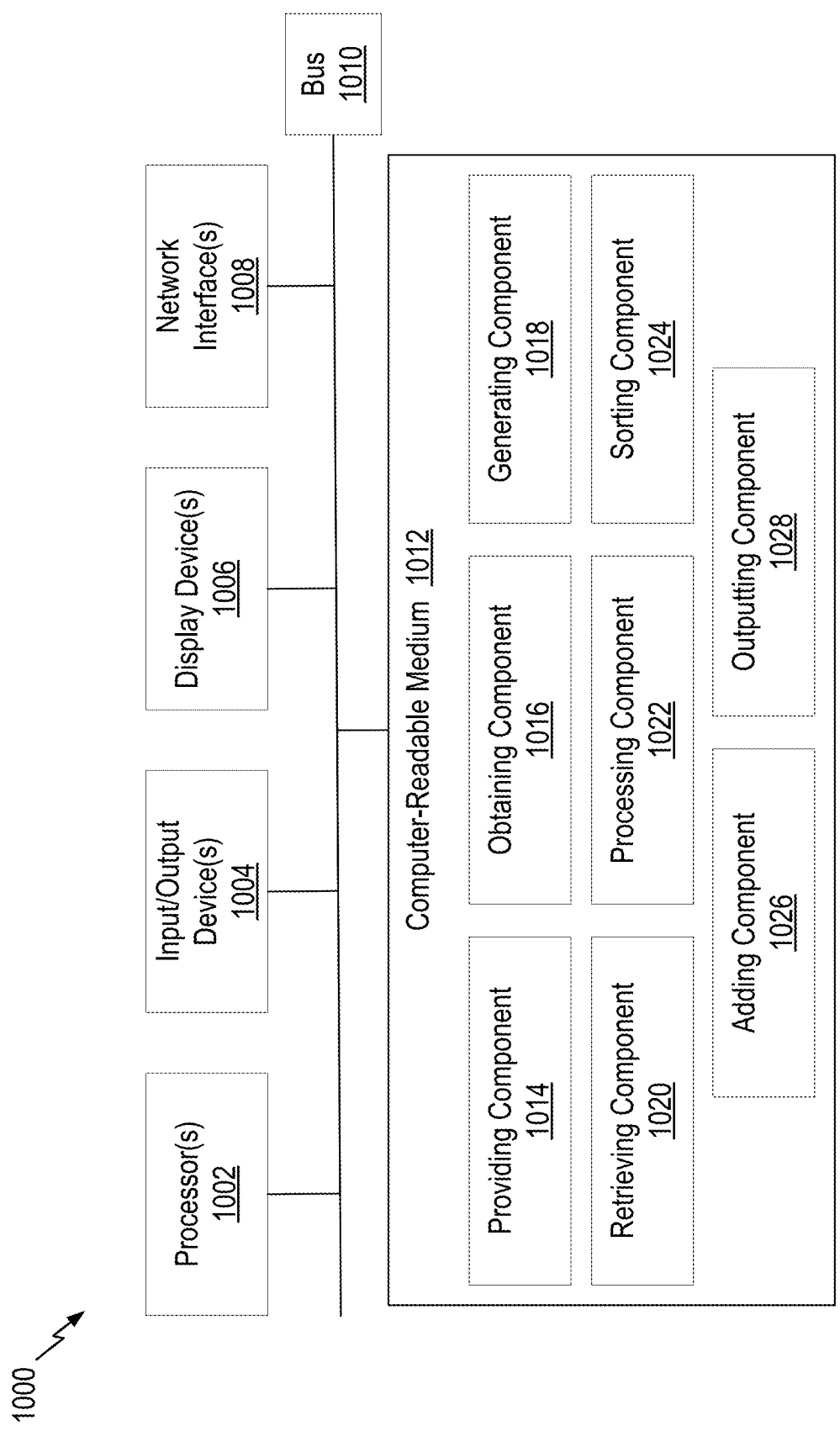
FIG. 10 depicts an example processing system with which aspects of the present disclosure can be performed.

FIG. 10 depicts an example processing system 1000 configured to perform various aspects described herein, including, for example, method 800 as described above with respect to FIG. 8 and method 900 as described above with respect to FIG. 9.

Processing system 1000 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1000 includes one or more processors 1002, one or more input/output devices 1004, one or more display devices 1006, one or more network interfaces 1008 through which processing system 1000 is connected to one or more networks (e.g., a local network, an intranet, the Internet, or any other group of processing systems communicatively connected to each other), and computer-readable medium 1012. In the depicted example, the aforementioned components are coupled by a bus 1010, which may generally be configured for data exchange amongst the components. Bus 1010 may be representative of multiple buses, while only one is depicted for simplicity.

Processor(s) 1002 are generally configured to retrieve and execute instructions stored in one or more memories, including local memories like computer-readable medium 1012, as well as remote memories and data stores. Similarly, processor(s) 1002 are configured to store application data residing in local memories like the computer-readable medium 1012, as well as remote memories and data stores. More generally, bus 1010 is configured to transmit programming instructions and application data among the processor(s) 1002, display device(s) 1006, network interface(s) 1008, and/or computer-readable medium 1012. In certain embodiments, processor(s) 1002 are representative of a one or more central processing units (CPUs), graphics processing unit (GPUs), tensor processing unit (TPUs), accelerators, and other processing devices.

Input/output device(s) 1004 may include any device, mechanism, system, interactive display, and/or various other hardware and software components for communicating information between processing system 1000 and a user of processing system 1000. For example, input/output device(s) 1004 may include input hardware, such as a keyboard, touch screen, button, microphone, speaker, and/or other device for receiving inputs from the user and sending outputs to the user.

Display device(s) 1006 may generally include any sort of device configured to display data, information, graphics, user interface elements, and the like to a user. For example, display device(s) 1006 may include internal and external displays such as an internal display of a tablet computer or an external display for a server computer or a projector. Display device(s) 1006 may further include displays for devices, such as augmented, virtual, and/or extended reality devices. In various embodiments, display device(s) 1006 may be configured to display a graphical user interface.

Network interface(s) 1008 provide processing system 1000 with access to external networks and thereby to external processing systems. Network interface(s) 1008 can generally be any hardware and/or software capable of transmitting and/or receiving data via a wired or wireless network connection. Accordingly, network interface(s) 1008 can include a communication transceiver for sending and/or receiving any wired and/or wireless communication.

Computer-readable medium 1012 may be a volatile memory, such as a random access memory (RAM), or a nonvolatile memory, such as nonvolatile random access memory (NVRAM), or the like. In this example, computer-readable medium 1012 includes providing component 1014, obtaining component 1016, generating component 1018, retrieving component 1020, processing component 1022, sorting component 1024, adding component 1026, and outputting component 1028. Processing of the components 1014-1028 may enable and cause the processing system 1000 to perform the method 800 described with respect to FIG. 8, or any aspect related to it, and/or the method 900 described with respect to FIG. 9, or any aspect related to it.

In certain embodiments, providing component 1014 is configured to provide, to a ML model, a first prompt comprising a first image and a first instruction to output a first description of the first image including a description of any unidentified visual object, as described in FIG. 8 with reference to block 805. In certain embodiments, obtaining component 1016 is configured to obtain, from the ML model, the first description, the first description comprising an identification of an unidentified visual object, as described in FIG. 8 with reference to block 810. In certain embodiments, generating component 1018 is configured to generate an embedding of the unidentified visual object included in the first description, as described in FIG. 8 with reference to block 815. In certain embodiments, obtaining component 1016 is configured to obtain, from a RAG database, an embedding associated with a known visual object and satisfying a similarity threshold with respect to the embedding of the unidentified visual object, as described in FIG. 8 with reference to block 820. In certain embodiments, retrieving component 1020 is configured to retrieve information associated with the known visual object, as described in FIG. 8 with reference to block 825. In certain embodiments, generating component 1018 is configured to generate an enhanced context comprising the information associated with the known visual object, as described in FIG. 8 with reference to block 830. In certain embodiments, providing component 1014 is configured to provide, to the ML model, a second prompt comprising the enhanced context and a second instruction to output a second description of the first image, as described in FIG. 8 with reference to block 835. In certain embodiments, obtaining component 1016 is configured to obtain, from the ML model, the second description including an identification of a visual object associated with the unidentified visual object from the first description, as described in FIG. 8 with reference to block 840.

In certain embodiments, generating component 1018 is configured to generate a first description of a first image comprising an identification of an unidentified visual object, as described in FIG. 9 with reference to block 905. In certain embodiments, generating component 1018 is configured to generate an embedding of the unidentified visual object included in the first description, as described in FIG. 9 with reference to block 910. In certain embodiments, obtaining component 1016 is configured to obtain, from a retrieval augmented generation (RAG) database, an embedding associated with a known visual object and satisfying a similarity threshold with respect to the embedding of the unidentified visual object, as described in FIG. 9 with reference to block 915. In certain embodiments, retrieving component 1020 is configured to retrieve information associated with the known visual object, as described in FIG. 9 with reference to block 920. In certain embodiments, generating component 1018 is configured to generate an enhanced context comprising the information associated with the known visual object, as described in FIG. 9 with reference to block 925. In certain embodiments, generating component 1018 is configured to generate a second description of the first image, the second description including an identification of a visual object associated with the unidentified visual object from the first description, as described in FIG. 9 with reference to block 930.

Note that FIG. 10 is just one example of a processing system consistent with aspects described herein, and other processing systems having additional, alternative, or fewer components are possible consistent with this disclosure.

EXAMPLE CLAUSES

Implementation examples are described in the following numbered clauses:

Clause 1: A method, comprising: providing, to a ML model, a first prompt comprising a first image and a first instruction to output a first description of the first image including a description of any unidentified visual object; obtaining, from the ML model, the first description, the first description comprising an identification of an unidentified visual object; generating an embedding of the unidentified visual object included in the first description; obtaining, from a RAG database, an embedding associated with a known visual object and satisfying a similarity threshold with respect to the embedding of the unidentified visual object; retrieving information associated with the known visual object; generating an enhanced context comprising the information associated with the known visual object; providing, to the ML model, a second prompt comprising the enhanced context and a second instruction to output a second description of the first image; and obtaining, from the ML model, the second description including an identification of a visual object associated with the unidentified visual object from the first description.

Clause 2: The method of Clause 1, wherein generating the embedding of the unidentified visual object comprises processing a second image of the unidentified visual object with another ML model to generate at least one of a shallow layer embedding of the unidentified visual object or a deep layer embedding of the unidentified visual object, the shallow layer embedding related to a first feature of the unidentified visual object and the deep layer embedding related to a second feature of the unidentified visual object that is more abstract than the first feature.

Clause 3: The method of Clause 2, wherein processing the second image of the unidentified visual object with the other ML model comprises providing, to the other ML model, an extracted portion of the first image including the unidentified visual object as determined by a bounding box around the unidentified visual object in the first image.

Clause 4: The method of any one of Clauses 1-3, further comprising: obtaining, from the RAG database, a plurality of embeddings associated, respectively, with a plurality of known visual objects, each of the plurality of embeddings satisfying the similarity threshold with respect to the embedding of the unidentified visual object; and sorting the plurality of embeddings based on similarity with respect to the embedding of the unidentified visual object, wherein generating the enhanced context comprises adding, to the enhanced context, information associated with a defined number of known visual objects of the plurality of known visual objects that are most similar to the unidentified visual object based on the sorting.

Clause 5: The method of any one of Clauses 1-4, wherein generating the enhanced context comprises adding the first prompt to the enhanced context.

Clause 6: The method of any one of Clauses 1-5, further comprising outputting the second description to a system from which a request to generate a description of the first image is received.

Clause 7: The method of any one of Clauses 1-6, further comprising: obtaining a request to generate a marketing campaign narrative related to the first image; and generating the marketing campaign narrative based on the second description.

Clause 8: The method of any one of Clauses 1-7, wherein the first description comprises one or more detected visual objects, in addition to the unidentified visual object, in the first image and a spatial relationship of the one or more detected visual objects with respect to the unidentified visual object.

Clause 9: The method of any one of Clauses 1-8, wherein the unidentified visual object is associated with a confidence level generated by the ML model that does not satisfy a confidence level threshold.

Clause 10: The method of any one of Clauses 1-9, wherein the first instruction further instructs the ML model to determine a contextual fit of the unidentified visual object with the first image.

Clause 11: A method for wireless communications by an apparatus comprising: generating a first description of a first image comprising an identification of an unidentified visual object; generating an embedding of the unidentified visual object included in the first description; obtaining, from a RAG database, an embedding associated with a known visual object and satisfying a similarity threshold with respect to the embedding of the unidentified visual object; retrieving information associated with the known visual object; generating an enhanced context comprising the information associated with the known visual object; and generating a second description of the first image, the second description including an identification of a visual object associated with the unidentified visual object from the first description.

Clause 12: The method of Clause 11, wherein generating the first description comprises providing, to a ML model, a prompt comprising the first image and an instruction to output the first description of the first image including a description of any unidentified visual object, and obtaining, from the ML model, the first description of the first image comprising the identification of the unidentified visual object, wherein the ML model is configured via training to generate the first description.

Clause 13: The method of any one of Clauses 11-12, wherein generating the second description comprises providing, to a ML model, a prompt comprising the enhanced context and an instruction to output the second description of the first image, and obtaining, from the ML model, the second description including the identification of the visual object associated with the unidentified visual object from the first description, wherein the ML model is configured via training to generate the second description.

Clause 14: A processing system, comprising: memory comprising computer-executable instructions; and one or more processors configured to execute the computer-executable instructions and cause the processing system to perform a method in accordance with any one of Clauses 1-13.

Clause 15: A processing system, comprising means for performing a method in accordance with any one of Clauses 1-13.

Clause 16: A non-transitory computer-readable medium storing program code for causing a processing system to perform the steps of any one of Clauses 1-13.

Clause 17: A computer program product embodied on a computer-readable storage medium comprising code for performing a method in accordance with any one of Clauses 1-13.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
providing, to a machine learning (ML) model, a first prompt comprising a first image and a first instruction to output a first description of the first image including a description of any unidentified visual object;
obtaining, from the ML model, the first description, the first description comprising an identification of an unidentified visual object;
generating an embedding of the unidentified visual object included in the first description;
obtaining, from a retrieval augmented generation (RAG) database, an embedding associated with a known visual object and satisfying a similarity threshold with respect to the embedding of the unidentified visual object;
retrieving information associated with the known visual object;
generating an enhanced context comprising the information associated with the known visual object;
providing, to the ML model, a second prompt comprising the enhanced context and a second instruction to output a second description of the first image; and
obtaining, from the ML model, the second description including an identification of a visual object associated with the unidentified visual object from the first description.

2. The method of claim 1, wherein generating the embedding of the unidentified visual object comprises processing a second image of the unidentified visual object with another ML model to generate at least one of a shallow layer embedding of the unidentified visual object or a deep layer embedding of the unidentified visual object, the shallow layer embedding related to a first feature of the unidentified visual object and the deep layer embedding related to a second feature of the unidentified visual object that is more abstract than the first feature.

3. The method of claim 2, wherein processing the second image of the unidentified visual object with the other ML model comprises providing, to the other ML model, an extracted portion of the first image including the unidentified visual object as determined by a bounding box around the unidentified visual object in the first image.

4. The method of claim 1, further comprising:
obtaining, from the RAG database, a plurality of embeddings associated, respectively, with a plurality of known visual objects, each of the plurality of embeddings satisfying the similarity threshold with respect to the embedding of the unidentified visual object; and
sorting the plurality of embeddings based on similarity with respect to the embedding of the unidentified visual object,
wherein generating the enhanced context comprises adding, to the enhanced context, information associated with a defined number of known visual objects of the plurality of known visual objects that are most similar to the unidentified visual object based on the sorting.

5. The method of claim 1, wherein generating the enhanced context comprises adding the first prompt to the enhanced context.

6. The method of claim 1, further comprising outputting the second description to a system from which a request to generate a description of the first image is received.

7. The method of claim 1, further comprising:
obtaining a request to generate a marketing campaign narrative related to the first image; and
generating the marketing campaign narrative based on the second description.

8. The method of claim 1, wherein the first description comprises one or more detected visual objects, in addition to the unidentified visual object, in the first image and a spatial relationship of the one or more detected visual objects with respect to the unidentified visual object.

9. The method of claim 1, wherein the unidentified visual object is associated with a confidence level generated by the ML model that does not satisfy a confidence level threshold.

10. The method of claim 1, wherein the first instruction further instructs the ML model to determine a contextual fit of the unidentified visual object with the first image.

11. A processing system, comprising: one or more memories comprising computer-executable instructions; and one or more processors configured to execute the computer-executable instructions and cause the processing system to:
provide, to a machine learning (ML) model, a first prompt comprising a first image and a first instruction to output a first description of the first image including a description of any unidentified visual object;
obtain, from the ML model, the first description, the first description comprising an identification of an unidentified visual object;
generate an embedding of the unidentified visual object included in the first description;
obtain, from a retrieval augmented generation (RAG) database, an embedding associated with a known visual object and satisfying a similarity threshold with respect to the embedding of the unidentified visual object;
retrieve information associated with the known visual object;
generate an enhanced context comprising the information associated with the known visual object;
provide, to the ML model, a second prompt comprising the enhanced context and a second instruction to output a second description of the first image; and
obtain, from the ML model, the second description including an identification of a visual object associated with the unidentified visual object from the first description.

12. The processing system of claim 11, wherein to cause the processing system to generate the embedding of the unidentified visual object, the one or more processors are configured to cause the processing system to process a second image of the unidentified visual object with another ML model to generate at least one of a shallow layer embedding of the unidentified visual object or a deep layer embedding of the unidentified visual object, the shallow layer embedding related to a first feature of the unidentified visual object and the deep layer embedding related to a second feature of the unidentified visual object that is more abstract than the first feature.

13. The processing system of claim 12, wherein to cause the processing system to process the second image of the unidentified visual object with the other ML model, the one or more processors are configured to cause the processing system to provide, to the other ML model, an extracted portion of the first image including the unidentified visual object as determined by a bounding box around the unidentified visual object in the first image.

14. The processing system of claim 11, wherein the one or more processors are configured to execute the computer-executable instructions and cause the processing system to:
  obtain, from the RAG database, a plurality of embeddings associated, respectively, with a plurality of known visual objects, each of the plurality of embeddings satisfying the similarity threshold with respect to the embedding of the unidentified visual object; and
  sort the plurality of embeddings based on similarity with respect to the embedding of the unidentified visual object,
  wherein to cause the processing system to generate the enhanced context, the one or more processors are configured to cause the processing system to add, to the enhanced context, information associated with a defined number of known visual objects of the plurality of known visual objects that are most similar to the unidentified visual object based on the sorting.

15. The processing system of claim 11, wherein the first description comprises one or more detected visual objects, in addition to the unidentified visual object, in the first image and a spatial relationship of the one or more detected visual objects with respect to the unidentified visual object.

16. The processing system of claim 11, wherein the unidentified visual object is associated with a confidence level generated by the ML model that does not satisfy a confidence level threshold.

17. The processing system of claim 11, wherein the first instruction further instructs the ML model to determine a contextual fit of the unidentified visual object with the first image.

18. The method of claim 1, wherein the ML model is configured via training to generate the first description.

19. The method of claim 1, wherein the ML model is configured via training to generate the second description.

* * * * *